Figure 1:
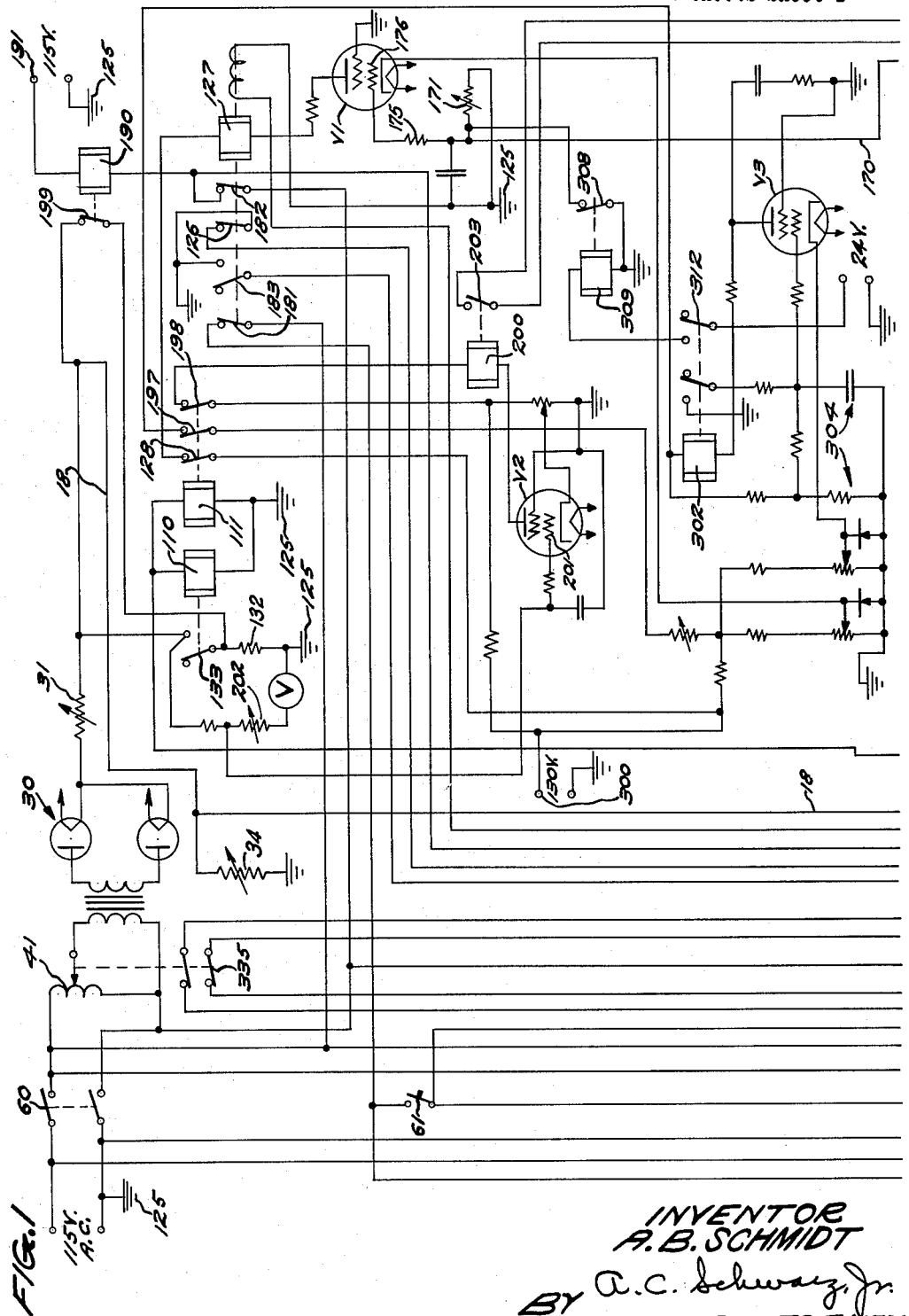

May 9, 1961 A. B. SCHMIDT 2,983,869
TESTING CIRCUIT

Filed May 18, 1959 4 Sheets-Sheet 1

INVENTOR
A. B. SCHMIDT
BY A.C. Schwarz, Jr.
ATTORNEY

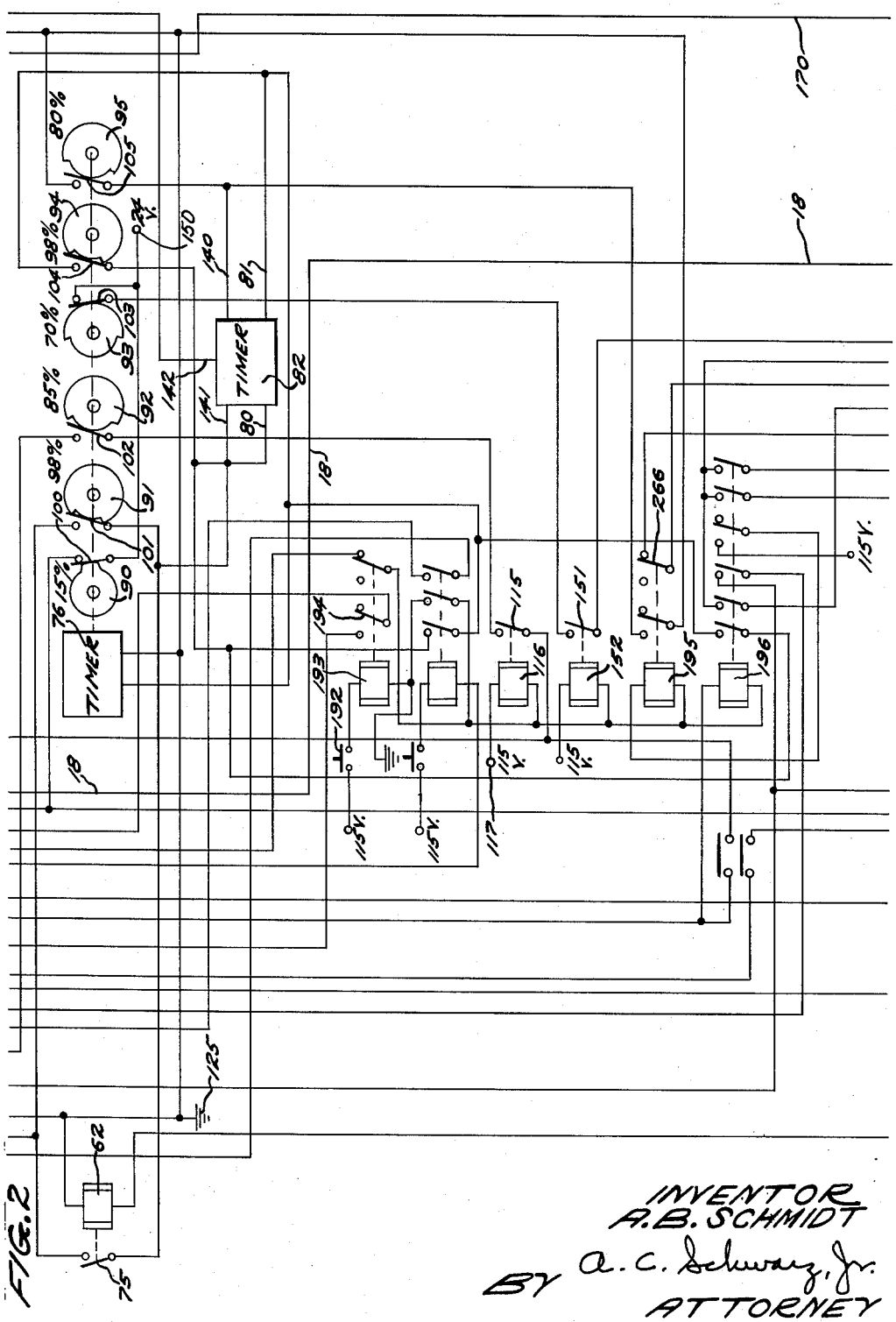

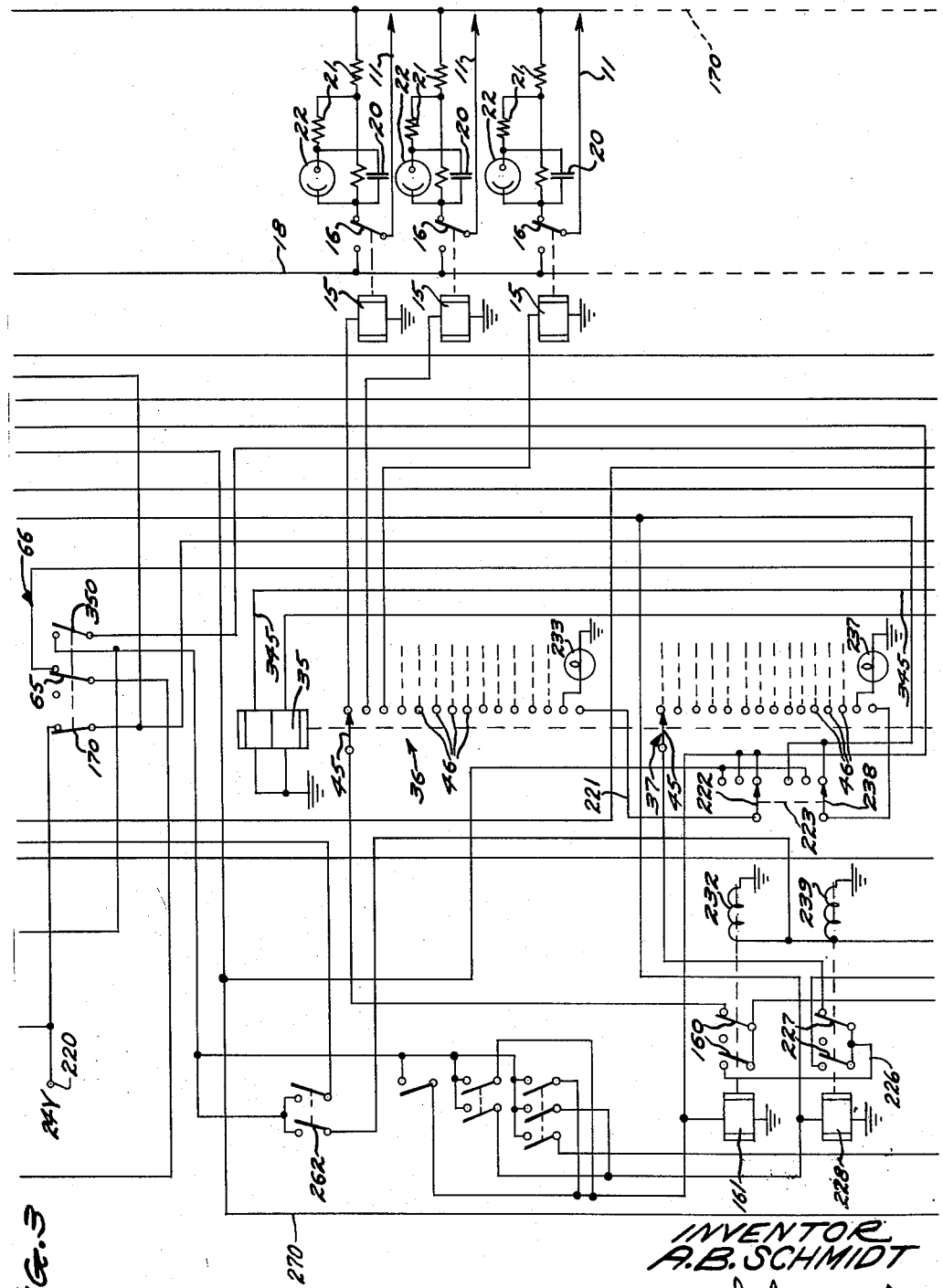

May 9, 1961 A. B. SCHMIDT 2,983,869
TESTING CIRCUIT
Filed May 18, 1959 4 Sheets-Sheet 4
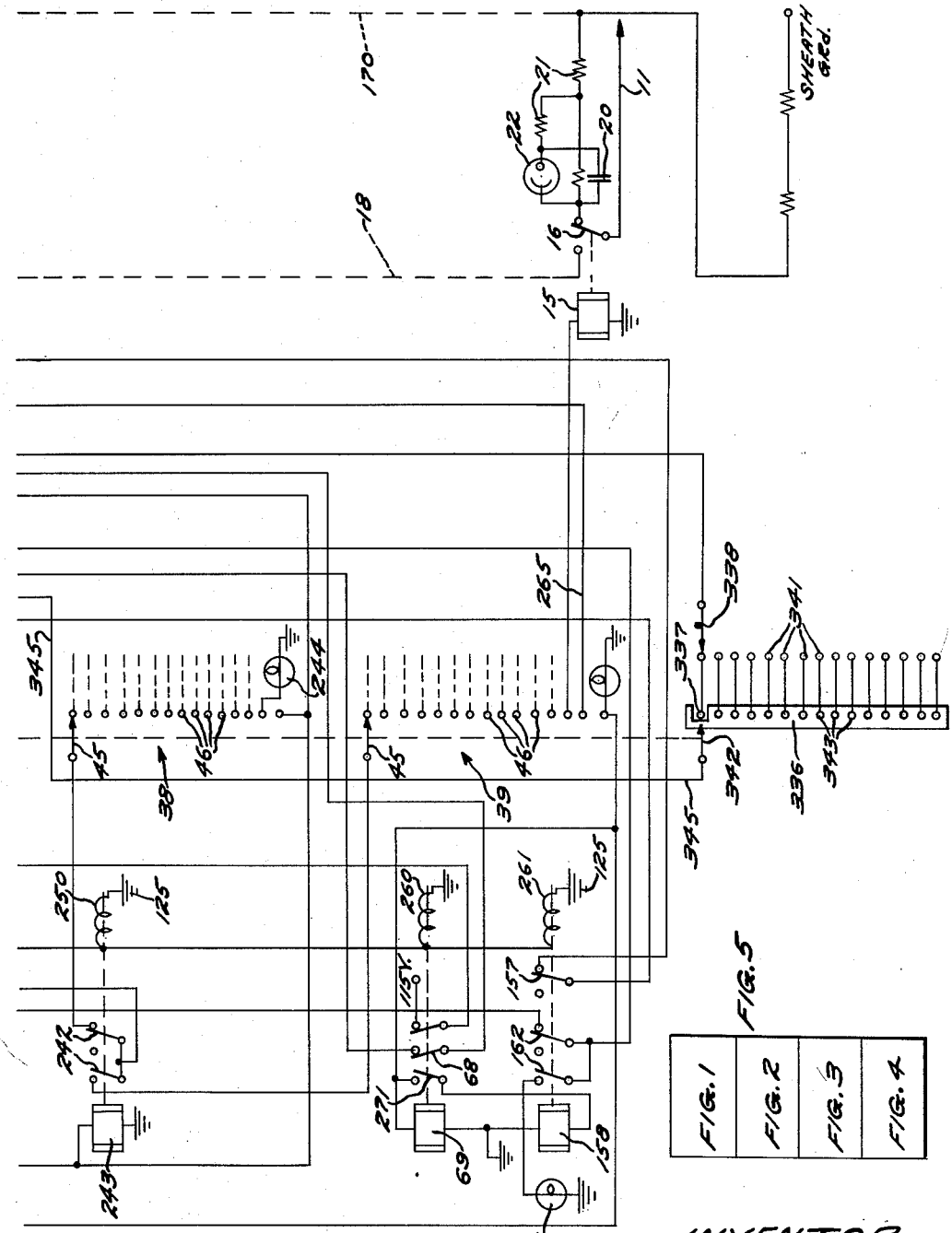
INVENTOR
A.B. SCHMIDT
BY C. C. Schwarz, Jr.
ATTORNEY

United States Patent Office 2,983,869
Patented May 9, 1961

2,983,869
TESTING CIRCUIT

Arthur B. Schmidt, Lombard, Ill., assignor to Western Electric Company, Incorporated, New York, N.Y., a corporation of New York Filed May 18, 1959, Ser. No. 813,735

6 Claims. (Cl. 324—73)

This invention relates to testing circuits and more particularly to circuits for performing high speed automatic testing of conductors in a cable.

In the past it has been difficult to test multiconductor cable for shorts, crosses and grounds, since the average cable has many insulated conductors each of which must be tested relative to all other conductors. It would be highly desirable to provide a system for automatically testing the insulated conductors in a rapid sequence. With this in mind, one of the objects of this invention is to provide a novel and improved testing circuit.

Another object of this invention is to provide a system for automatically testing insulated conductors of a cable for shorts, crosses and grounds.

A further object of this invention is to provide a testing system for applying a voltage sequentially to a plurality of insulated conductors and detecting any conductors having defective insulation.

One embodiment of the present invention may include circuitry for sequentially connecting a voltage to a plurality of insulated conductors of a cable. Detecting means sense a conductor having defective insulation and disables the testing system to remove the voltage from this conductor.

Other objects and advantages will become apparent when the following detailed description of the invention is read in conjunction with the appended drawings, in which:

Figs. 1, 2, 3 and 4 are a schematic diagram of a circuit embodying the principles of the present invention; and Fig. 5 shows the relationship of Figs. 1, 2, 3 and 4.

Referring now in detail to the drawings, there are shown a plurality of insulated conductors 11 (Figs. 3 and 4) to be tested. These conductors 11 are bound together to form a cable which is wrapped with a metallic sheath (not shown) covered by an insulating layer of a plastic material. This is a conventional cable construction. The present invention is adapted to test the conductors 11 for shorts, crosses and grounds, a ground being a short between a conductor and the metallic sheath and a cross being a short between a pair of conductors in the cable.

Each of the conductors 11 has associated therewith a relay 15 having a contactor 16 which is movable to connect the conductor 11 to a high voltage supply line 18 or to a network including a capacitor 20, resistances 21 and an indicating lamp 22. The relays 15 are energized in sequence to connect the conductors 11 one at a time to the voltage supply line 18.

In the event of a short between two conductors, the indicating lamp 22 associated with one of the shorted conductors will be lighted when the other conductor is connected to the voltage supply line 18.

Power is applied to the high voltage supply line 18 from a power supply 30, a rheostat 31 being provided for adjusting the maximum current flow in line 18. The testing potential applied to each conductor 11 in sequence as the cable is tested is controlled by an autotransformer 41 and by a variable resistor 34.

A stepping relay 35 having gang switches 36, 37, 38 and 39 is provided for facilitating the connection of the testing potential on the line 18 to each of the conductors 11 one at a time. Each of the gang switches 36–39 is provided with a contactor 45 and fifteen contacts, the first thirteen of which are designated by the numeral 46 and which are each connected to one of the relays 15. It can thus be seen that there are a total of 52 contacts 46 connected to conductors 11, so that the testing system is capable of testing a cable having 52 conductors 11. The contacts 46 are arranged, in actual practice, in a circle so that the contactors 45 engage each of the contacts in sequence and after engaging the fifteenth contact pass to the first contact, this being a conventional arrangement. The fourteenth contact of each gang switch 36–39 is connected to an indicating lamp, as shown, to give the operator an indication of how far the test has progressed.

To start the test, switches 60 and 61 are closed. The closing of the switch 61 energizes a relay 62 (Fig. 2) through a contactor 65 (Fig. 3) of a switch 66 and a contactor 68 of a relay 69. Energization of the relay 62 closes its contactor 75 to apply power to a first timer 76 through conductors 80 and 81 which are connected by a second timer 82. The first timer drives a plurality of cams 90, 91, 92, 93, 94 and 95 which are adapted to open and close contactors 100, 101, 102, 103, 104 and 105, respectively. The first timer 76, through the cams 90–95, controls the operation of the testing system, the timer 76 rotating the cams 90–95 through one revolution for each conductor 11 that is tested.

The percentages listed adjacent to each cam indicate the percentage of the testing cycle that the cam holds its associated contactor in closed position. For example, the "15%" above the cam 90 indicates that this cam holds the contactor 100 closed for only 15% of the timing cycle of this timer, a cycle being one revolution of the cams 90–95 and the testing of one conductor 11.

The second timer 82 is a motor driven timer of a well known type having internal contacts (not shown) for effecting connections between conductors leading to the timer. The timer 82 is provided with a clutch and a motor (not shown) which motor must be energized to operate the timer, this being a conventional arrangement.

As the cams 90–95 begin to rotate, the contactors 101 and 104 are closed simultaneously to begin the testing cycle. The closing of the contactor 104 provides a power circuit to the first timer 76, this circuit being parallel with the path through the conductors 80 and 81 so that operating power will be applied to the timer 76 through either the contactor 104, when closed, or the conductors 80 and 81 when connected together by the second timer 82.

The closing of the contactor 101 merely sets up an additional power circuit to the first timer 76 so that an inadvertent opening of the switch 61 during a testing cycle will not stop the first timer 76.

After 15% of the cycle, the cam 92 closes the contactor 102 to energize relays 110 and 111 through a closed contactor 115 of a relay 116. The relay 116 is connected to a power source 117 and to ground 125 through a closed contactor 126 of a relay 127. Energization of the relay 127 through a contactor 128 of the relay 111 will open the contactor 126 and and thereby break the power circuit to the relay 116, which opens the contactor 115 to deenergize the relays 110 and 111.

The relay 110 is provided for shorting the high voltage supply to ground 125, through a resistance 132, this shorting being accomplished when the relay 110 is energized to close a contactor 133. This shorting is held between cycles so that the potential on line 18 is lowered during the switching from one conductor 11 to another.

At approximately 20% of the cycle, the cam 95 closes the contactor 105 to ground terminal 140 of the second timer 82, the clutch of the timer 82 being connected between the terminal 140 and a terminal 141 which is connected to power through the closed contactor 75 of the relay 62. This resets and prepares the second timer 82 for starting its timing cycle which will be effected when a terminal 142 connected to the driving motor of the timer is grounded. This timer continues to run until the cam 95 opens the contactor 105 at 80% of the cycle.

At 30% of the cycle, the cam 93 closes the contactor 103 to apply 24 volt power from a source 150 to the stepping relay 35 through a closed contactor 151 of a relay 152 and a closed contactor 157 of a deenergized relay 158. This causes the stepping relay 35 to move the contactors 45 of the gang switches from the fifteenth contact (this being the start position) to the first contact 46.

When the contactors 45 engage the first contacts of the gang switches, power is applied through the contactor 45 of the gang switch 36 to the relay 15 associated with the first conductor 11 to be tested, whereupon this relay 15 closes its contactor 16 to connect the high voltage supply line 18 to the first conductor 11. The circuit for energizing the relay 15 includes the contactor 45 of the gang switch 36, a contactor 160 of a deenergized relay 161, a contactor 162 of the deenergized relay 158, and a closed contactor 170 of the switch 66. This circuit is maintained during the first revolution of the gang switches 36–39 so that, as the relay 35 is stepped, the first thirteen relays 15 are energized one after the other to test in sequence the first thirteen conductors 11. Four revolutions of the gang switch contactors 45 are necessary to test 52 conductors 11.

With the voltage supply line 18 connected to the first conductor 11, the relay 110 is still energized to maintain its contactor 133 closed to short the voltage supply 30 to ground 125 through the resistance 132. This holds down the potential on line 18 during during the switching from one conductor 11 to another.

The relay 110 is deenergized to open its contactor 133 and disconnect the resistance 132 and ground 125 from the voltage supply 30 when the cams 90–95 complete one revolution, thereby applying the full output potential to the line 18 and the conductor 11 under test. The deenergization of the relay 110 is effected by the opening of the contactor 103 at the end of the cycle, the cams 90–95 being rotated through one revolution during each cycle.

With the resistance 132 disconnected from the voltage supply line 18, the voltage applied to the conductor 11 under test builds up to a maximum value, the time required for this buildup being a function of the length of the cable. This is a result of the inherent capacitance beween the conductor 11 under test and the remaining conductors in the cable. During this buildup, current will flow in the remaining conductors 11 in the cable, these conductors being connected through contactors 16 to a line 170 leading through a variable resistance 171 to ground 125.

When the voltage on the conductor 11 under test has reached its maximum value, i.e., when the capacitance value of the cable has been fully charged, no further current will flow in the line 170. After this point is reached, any current flow in the line 170 is indicative of an insulation failure, or short, between the conductor 11 under test and one of the remaining conductors 11. The lamp 22 associated with this one remaining conductor will be energized to indicate the fact that this conductor is shorted to the conductor 11 under test.

Circuitry is provided for detecting any current flow in the line 170 to indicate that an insulation failure, or short, has occurred. However, this circuitry must be disabled during the buildup of voltage on the conductor 11 under test in order to prevent a false indication of insulation breakdown.

The line 170, through which a surge of current will flow in the event of an insulation breakdown, is connected to ground 125 through the variable resistor 171 and is also connected by a resistor 175 to a grid 176 of a tube $V_1$. If the insulation on the conductor under test does not fail under the high voltage applied thereto, no current will flow in the line 170 (after the voltage on the conductor 11 under test has reached its maximum value) and the grid 176 will be at ground potential, thereby precluding conduction of the tube $V_1$. If, however, a surge of current occurs in the line 170, a voltage will appear across the variable resistance 171. This voltage will be sufficient to fire the tube $V_1$, the grid 176 being connected to the variable resistance 171 through resistor 175. Conduction of the tube $V_1$ operates to disable the system and stop the test.

When the tube $V_1$ conducts, this resulting from an insulation breakdown, the relay 127 is energized to open contactors 181, 126 and 182 and close contactor 183. The opening of contactor 182 deenergizes a relay 190 which is connected to voltage source 191. Contactor 199 closes as relay 190 is deenergized, and connects the high voltage supply line 18 to ground 125 through resistor 132. This considerably lowers the potential on the line 18 and the conductor 11 under test. The relay 190 may also be energized by closing a switch 192 to energize a relay 193 which closes its contactor 194.

The opening of the contactor 126 opens the circuit to the relays 116 and 152 and relays 195 and 196, deenergizing all of these relays. Deenergization of the relay 152 opens its contactor 151 to prevent further operation of the stepping relay 35. The opening of the contactor 181 deenergizes the relay 62 to open the contactor 75 for stopping the first and second timers 76 and 82. The testing operation is thus stopped at this point.

As pointed out above, some provision must be made to prevent conduction of the tube $V_1$, with the resultant disabling of the system, during the buildup of voltage on the conductor 11 under test. This is accomplished by removing the resistance 171, across which a biasing voltage appears in response to an insulation failure, from the circuit during the voltage buildup.

At 15% of the cycle of the first timer 76, the relay 110 was deenergized to disconnect the resistance 132 from the high voltage line 18 to permit the voltage on the line 18 to rise to a testing or maximum value. The relay 111, being connected in parallel with the relay 110, was also deenergized to close contactors 197 and 198.

The closing of the contactors 197 and 198 connects a voltage source 300 to a tube $V_3$. This circuit includes resistances 301, the contactor 197, a relay 302 connected to the plate of the tube $V_3$ and a resistance-capacitance network 304 connected to the grid of the tube $V_3$. When the relay 111 is first deenergized, a charge begins to build up on the R-C network 304, with very little or no current flowing through the relay 302. At this time a contactor 308 of a deenergized relay 309 grounds the line 170 so that current flowing in this line will not set up a voltage across the variable resistance 171 and cause the firing of the tube $V_1$.

When the R-C network 304 is charged sufficiently, the tube $V_3$ will fire and energize the relay 302. This closes a contactor 312 and connects a voltage source 313 to the relay 309, whereupon the contactor 308 is opened. At this time any current flowing in the line 170 will be the result of an insulation breakdown. If such a current is flowing in the line 170, a voltage will be set up across the resistance 171 and the tube $V_3$ will conduct to disable the circuit as above described. In this manner, the circuit including the relay 302, the R-C network 304 and the tube $V_3$ serves to disable the breakdown or failure detecting portion of the system during the time interval in which the voltage on the conductor 11 under test is building up to a maximum or test value.

Once the high voltage supply line 18 is connected to the conductor 11 to be tested, it is necesary to control the time interval in which the testing voltage is to remain applied to the conductor. This is controlled by the second timer 82. In order that the second timer 82 operates, it is necessary to apply power to the terminal 141 and to ground the terminals 140 and 142. Energization of the relay 62 closed the contactor 75 to apply power to the terminal 141, and the cam 95 closes the contactor 105 at 20% of the cycle of the first timer 76 to ground the terminal 140. All that must be done now to start the second timer 82 is to ground the terminal 142.

A circuit including a tube $V_2$ and a relay 200 is provided for grounding the terminal 142 of the second timer 82 to time the test interval. The tube $V_2$ has a grid 201 connected to a variable resistance 202 across which the test potential appears, this resistance being connected to the high voltage line 18. The resistance 202 is set to cause the tube $V_2$ to conduct when the potential on the line 18 has reached a maximum value. Conduction of the tube $V_2$ energizes the relay 200, which closes a contactor 203 to ground the terminal 142 of the second timer 82. This starts the second timer in its timing cycle.

The second timer 82 immediately breaks the connection between the conductors 80 and 81 so that, when the cams 90–95 have completed one revolution, the opening of the contactor 104 will disconnect the first timer 76 from power and stop it. The first timer 76 is not energized again until the second timer 82 times out and reconnects the conductors 80 and 81, whereupon the sequence of operation is repeated in testing the next conductor 11.

The stepping relay 35 has associated therewith a circuit for connecting the contactor 45 of the first gang switch 36 to power during the first revolution of the contactors 45, the contactor 45 of the second gang switch 37 to power during the second revolution, the contacor 45 of the third gang switch 38 to power during the third revolution of the contactors, and contactor 45 of the fourth gang switch 39 to power during the fourth revolution of the contactors. Under this arrangement, the relays 15 are energized in sequence to connect the conductors 11 one after the other to the high voltage line 18 for testing. Thus, four revolutions of the contactors 45 are required for testing a cable having 52 conductors.

During the first revolution of the contactors 45, power is applied to the first thirteen relays 15 one at a time to test the first thirten conductors 11. This power circuit is made from a voltage source 220 through the contactor 170 of the switch 66, the contactor 162 of the relay 158, and the contactor 160 of the relay 161. Both the first timer 76 and the second timer 82 run through their timing cycles during the testing of each conductor 11.

When the contactor 45 of the first gang switch 36 reachs the fourteenth contact on that switch a lamp 233 is energized to indicate to an operator that the first thirteen conductors 11 have been tested and that tests are about to begin on the next thirteen.

When the contactor 45 of the first gang switch contacts the fifteenth contact on that swich, power is applied through a lead 221 and a contactor 22 of a switch 223 to the relay 161, which relay moves the contactor 160 to connect the power source through a lead 226 and a contactor 227 of a relay 228 to the contactor 45 of the second gang switch 37. The contactor 160 will be held in this condition until a release coil 232 associated with the relay 161 is energized.

Upon the next step of the relay 35, the fourteenth conductor 11 is tested. When the contactor 45 of the second gang switch 37 contacts the fourteenth contact of that switch, a lamp 237 is energized to indicate to an operator that the second 13 conductors 11 have been tested. Upon the next step of the relay 35, power is applied through a contactor 238 of the switch 223 to operate the relay 228. This establishes a power circuit to the contactor 45 of the third gang switch 38 through the locked contactor 160 of the relay 161, the contactor 227 of the relay 228 and a contactor 242 of a relay 243. The contactor 227 is held in this condition until a release coil 239 is energized.

The contactor 45 of the third gang switch 38 energizes a lamp 244 when the fourteenth contact of this switch is reached and, upon reaching the fifteenth contact, applies power to the relay 243. This sets up a power circuit to the contactor 45 of the fourth gang switch 39 through the locked contactors 160, 227 and 242. The contactor 242 is held in locked condition until a release coil 250 is energized. The release coils 232, 239, 250 and release coils 260 and 261 associated with the relays 69 and 158, may be energized by closing a release switch 262. This unlocks the contactors associated with the relays 161, 228, 243, 69 and 158 and restores them to the positions shown in the drawings.

When the contactor 45 of the fourth gang switch 39 reaches the fourteenth contact of that switch, power is applied to a lead 265 connected to a contactor 266 of the relay 195. However, if the circuit is functioning properly, the relay 195 is energized and the contactor 266 is open. In the event that the circuit has been disabled, the relay 195 will be deenergized and the contactor 266 will be closed, so that power applied to the fourteenth contact of the gang switch 39 will operate through a conductor 270 to energize the relays 69 and 158, the relay 158 being energized through a contactor 271 of the relay 69. This same result occurs when power is connected to the fifteenth contact of the gang switch 39.

When the relays 69 and 158 are energized, this normally occurring when all of the conductors 11 have been tested, a lamp 275 is energized to indicate that the testing has been completed. Also, the contactor 162 is opened to disconnect the voltage source 220 from the contactors 45 of the gang switches 36–39, and the contactor 157 is opened to disconnect the stepping relay 35 from power. The opening of the contactor 157 deenergizes the relay 62, thereby disconnecting the timers 76 and 82 from power. This ends the test of the 52 conductors 11 in the cable.

Conductors of another cable are now connected as shown and the above procedure is repeated to test these conductors.

In the event that it should be desirable to rapidly position and stop the contactors 45 of the gang switches 36–39 on a predetermined contact, the autotransformer 41, which supplies input power to the power supply 30, is set to a minimum value. This closes a switch 335 mechanically linked to the autotransformer 41 and also insures that the output voltage of the supply 30 is low, the purpose of this operation being not to test but to rapidly position the contactors 45.

The switch 40 has a conductive disc 336 (shown in the drawings as a bar) with a notch 337 therein. A contactor 338 may be manually set to one of fifteen contacts 341, the particular contact being determined by the position in which it is desired to stop the contactors 45 of the gang switches 36–39. For example, if it is desired to rapidly position the contactors 45 on the tenth contact of the switches 36–39, the contactor 338 is manually set to engage the tenth contact 341.

The contacts 341 are connected to contacts 343 which ride along the surface disc 336. The construction of the contacts 343 and disc 336 is such that, upon each step of the relay 35, one of the contacts 343 is positioned in the notch 337 in the disc 336 so that, if the contactor 338 is set to that particular position, the circuit between the contactors 338 and 342 is broken. Another contactor 342 engages the surface of the conductive disc 336 to complete a circuit through a lead 345 to the relay 35.

When power is applied to the lead 345, the relay 35 automatically steps from position to position continuously, this being a well known characteristic of this type of relay. The circuit to the lead 345 includes the contactor 342, the conductive disc 336, the manually set contactor 338, a contactor 350 of the switch 66, the switch 335 and the voltage source 220.

The relay 35 will thus stop when the contact 343 connected through a contact 341 to the contactor 338 enters the notch 337 in the disc 336. For example, if the contactor 338 is set on the tenth contact 341, the connection between the contactors 338 and 342 will be broken when the tenth contact 343 enters the notch 337. This will stop the relay 35, with the contactors 45 on the tenth contact of the gang switches 36–39.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. A system for testing insulation on a pair of conductors, comprising a voltage supply connected to one of the conductors, means connected to the other conductor of said pair for sensing and indicating a flow of current, and means connected to the voltage supply for disabling the sensing and indicating means until the voltage supply has charged the capacitance inherent between the pair of conductors.

2. A system for testing an insulated conductor, comprising a voltage supply, circuit means for connecting the voltage supply to the conductor to be tested, a detector circuit for sensing a failure in the insulation of the conductor, means associated with the detector circuit for disabling said circuit until the voltage on the conductor has reached a predetermined value, and means operated in response to said voltage reaching said predetermined value for timing the duration of the test.

3. A system for testing insulation on a conductor, comprising a voltage supply, circuit means for connecting the voltage supply to the conductor, timing means, means responsive to a predetermined voltage on the conductor for actuating the timing means, said timing means controlling the time interval in which the voltage supply is connected to the conductor, and means responsive to failure of the insulation on the conductor for disabling the system.

4. A system for testing a plurality of insulated conductors in a cable, comprising a voltage supply, circuit means for switching the voltage supply from one conductor to another, means associated with the circuit means for grounding the voltage supply during said switching, a detector circuit connected to the conductors for sensing a failure in the insulation of a conductor, means operated by the detector circuit for disabling the system when an insulation failure occurs, and means connected to the detector circuit for disabling said circuit until the voltage applied to the conductor under test by the voltage supply has reached a predetermined value.

5. A system for testing a plurality of insulated conductors in a cable, comprising a voltage supply, a control circuit for connecting the voltage supply to the conductors one at a time, detector means for disabling the system in response to a flow of electrical current, means associated with each conductor for normally connecting said conductors to the detector means, said normally connecting means associated with the one conductor connected to the voltage supply being disabled so that current flow in the remaining conductors in the event of an insulation failure, means connected to the voltage supply for disabling the detector means until the voltage applied to the conductor under test has reached a predetermined value, means operated by the control circuit for limiting the duration in which the voltage supply is connected to a conductor, and means connected to the control circuit for disabling the system after a predetermined number of conductors have been tested.

6. A system for testing a plurality of insulated conductors, comprising a test voltage supply, a switching circuit for connecting the conductors one at a time to the test voltage supply, a control circuit connected to the switching circuit for actuating said switching circuit, a detector circuit connected to the conductors for sensing current flow resulting from an insulation failure, a delay circuit connected to the detector circuit for disabling said detector circuit until the voltage applied to a conductor has reached a predetermined value, a timer connected to the control circuit for disabling the test voltage supply after a predetermined time interval, a network connected to the timer and responsive to the voltage applied to the conductor for actuating said timer when the voltage applied to the conductor has reached said predetermined value, and means connected to the control circuit for disabling the system after a predetermined number of conductors have been tested.

References Cited in the file of this patent
UNITED STATES PATENTS

| | | |
|---|---|---|
| 2,181,560 | Blount | Nov. 28, 1939 |
| 2,805,391 | Meadows et al. | Sept. 3, 1957 |
| 2,830,264 | Wittmann | Apr. 8, 1958 |
| 2,904,750 | Gargani et al. | Sept. 15, 1959 |